Nov. 1, 1927.
J. B. HAWLEY, JR
FLUID TRANSMISSION AND THE LIKE
Filed Jan. 2, 1925
1,647,621
7 Sheets-Sheet 3
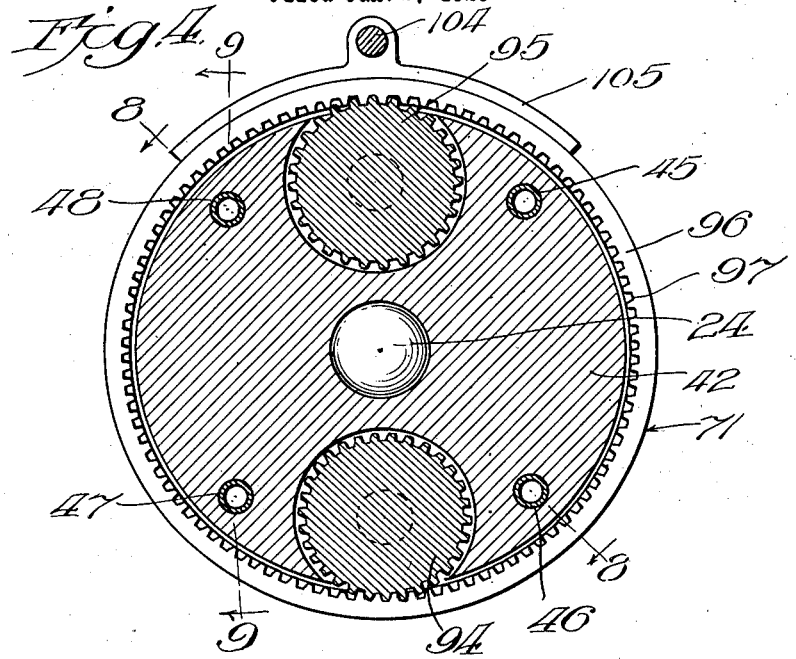
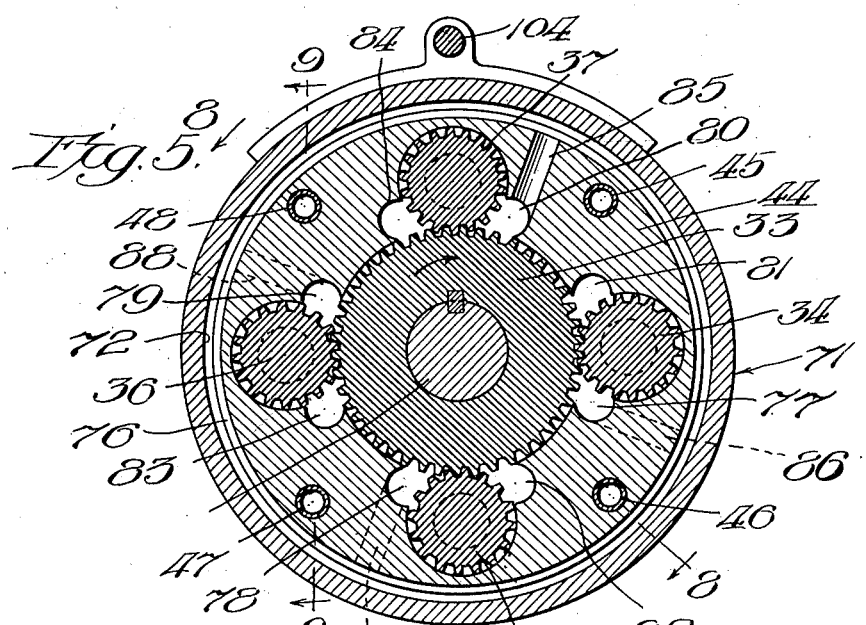
Inventor:
John B. Hawley, Jr.

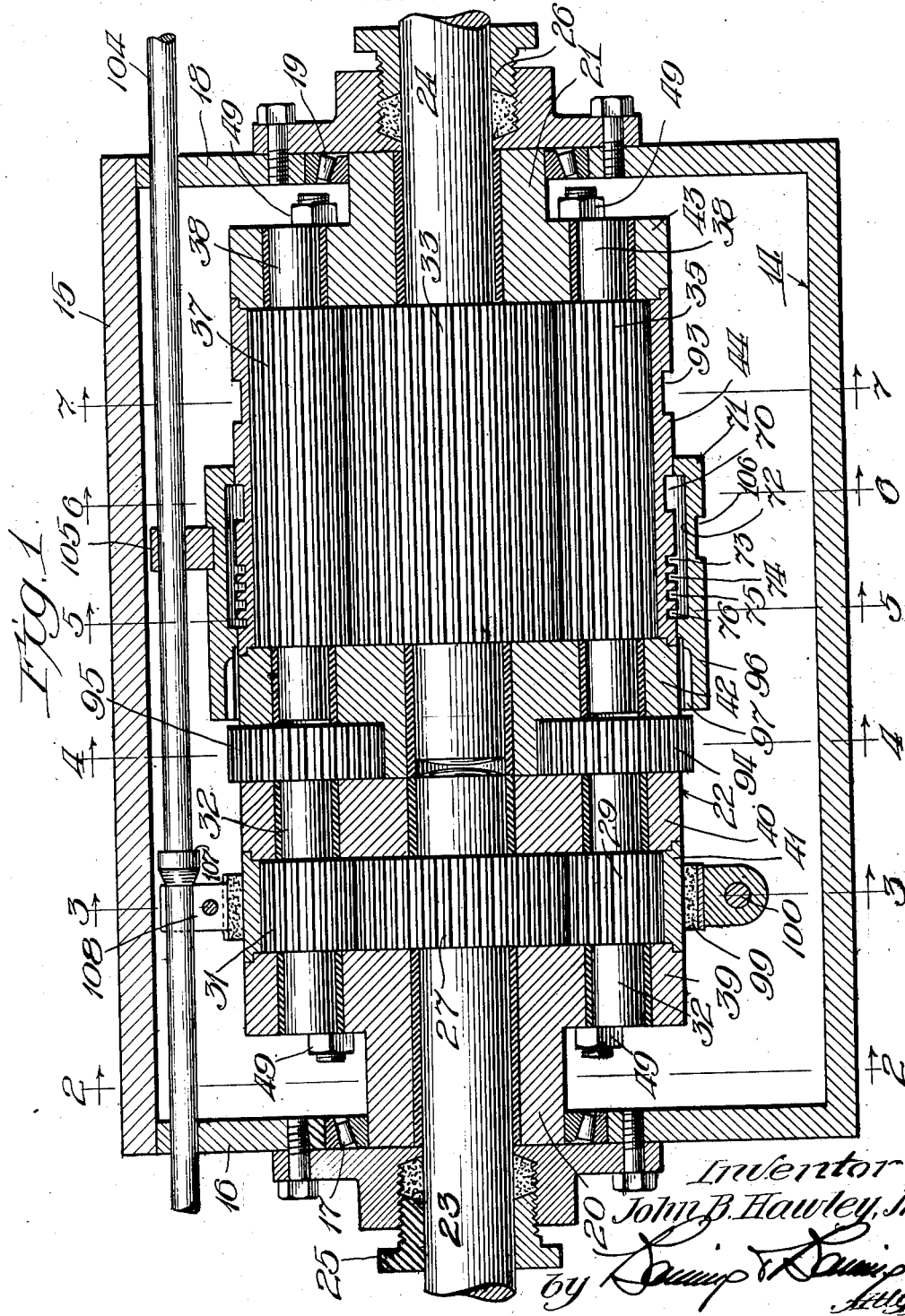

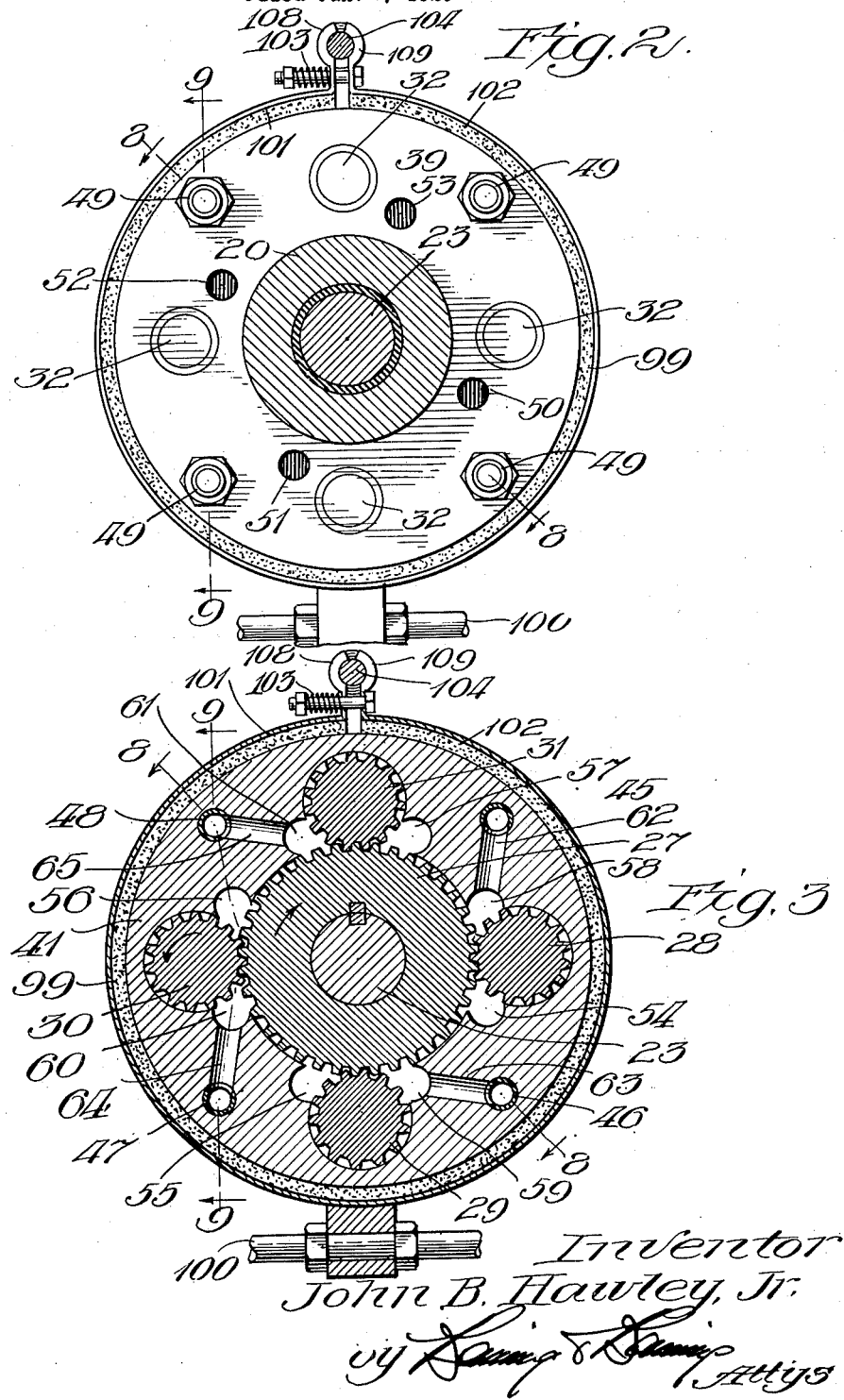

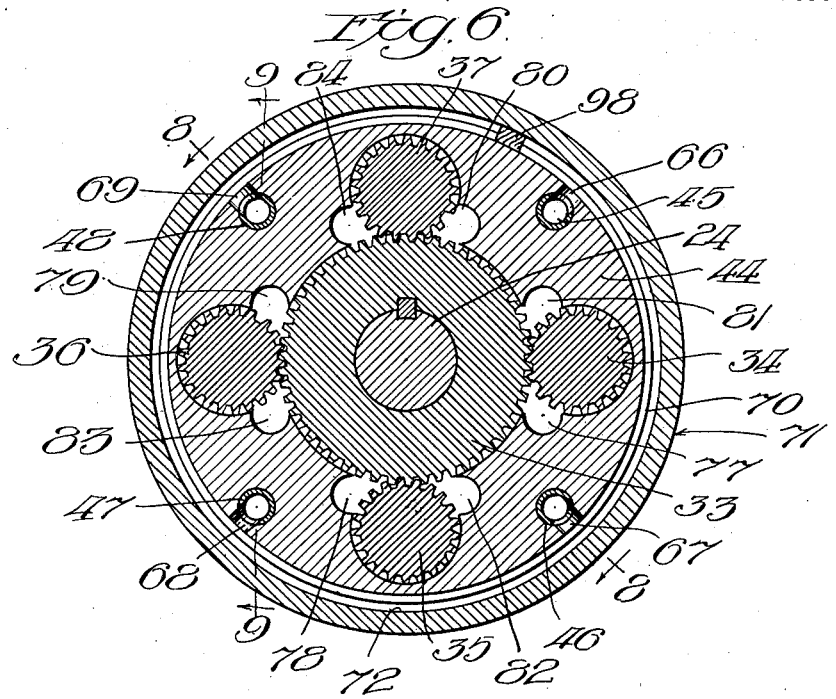
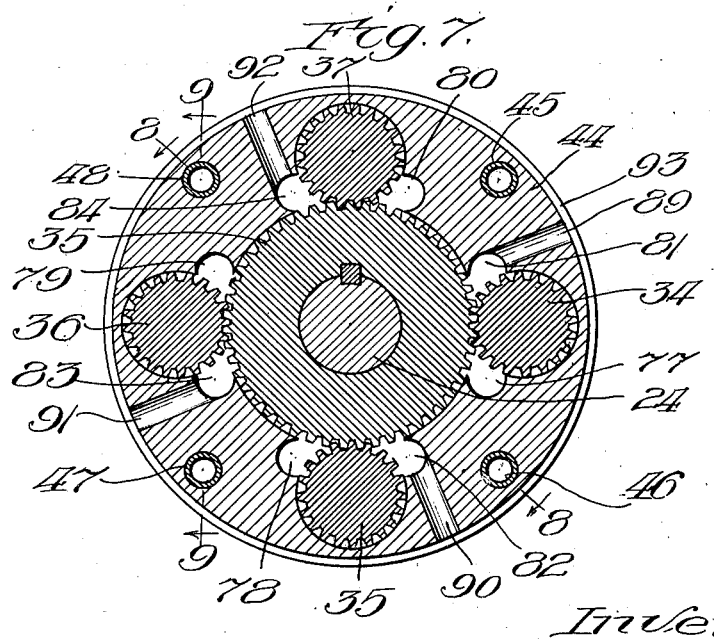

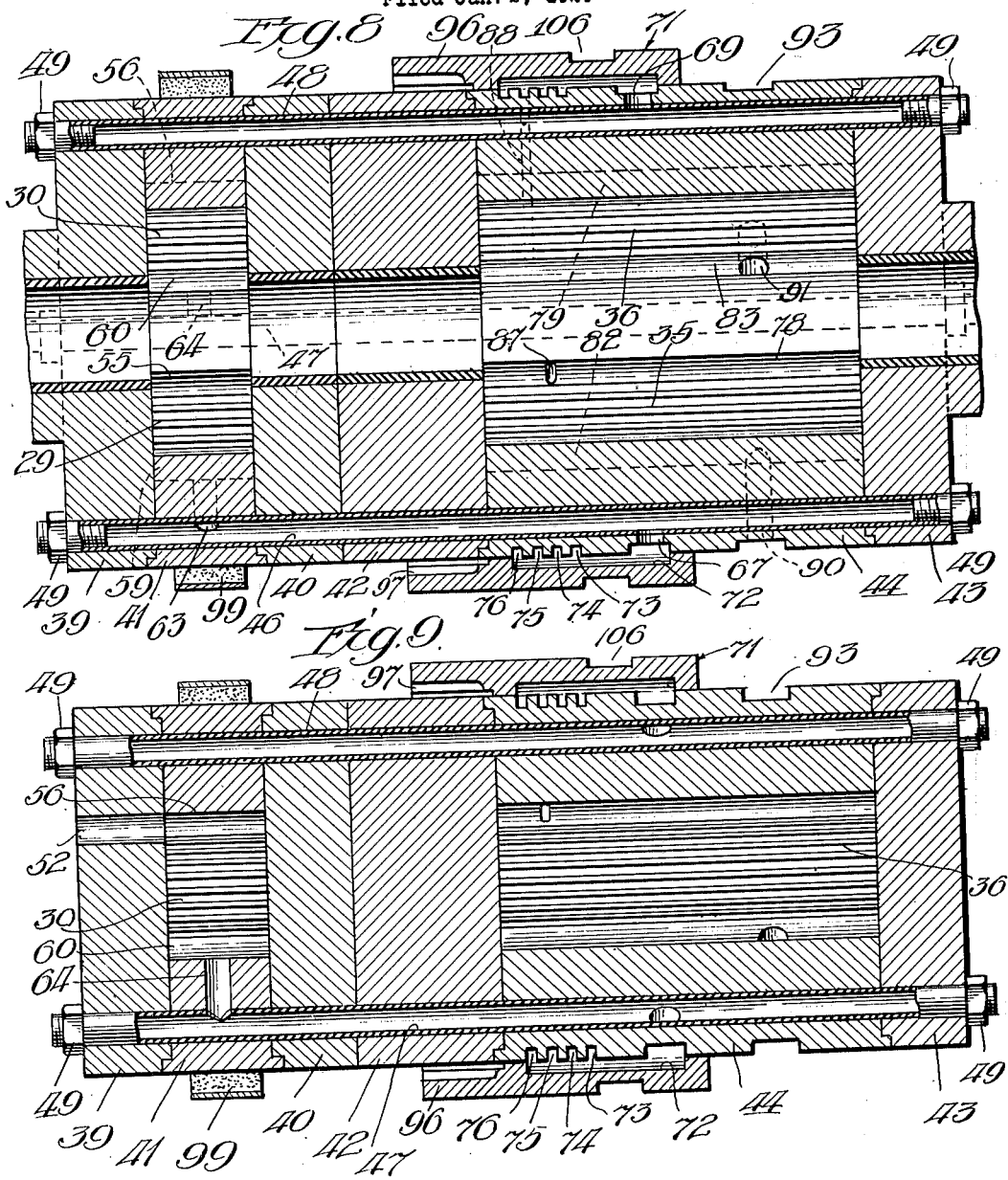

Nov. 1, 1927.  1,647,621
J. B. HAWLEY, JR
FLUID TRANSMISSION AND THE LIKE
Filed Jan. 2, 1925   7 Sheets-Sheet 6

Inventor:
John B. Hawley, Jr.
by Lanning & Lanning
Attys

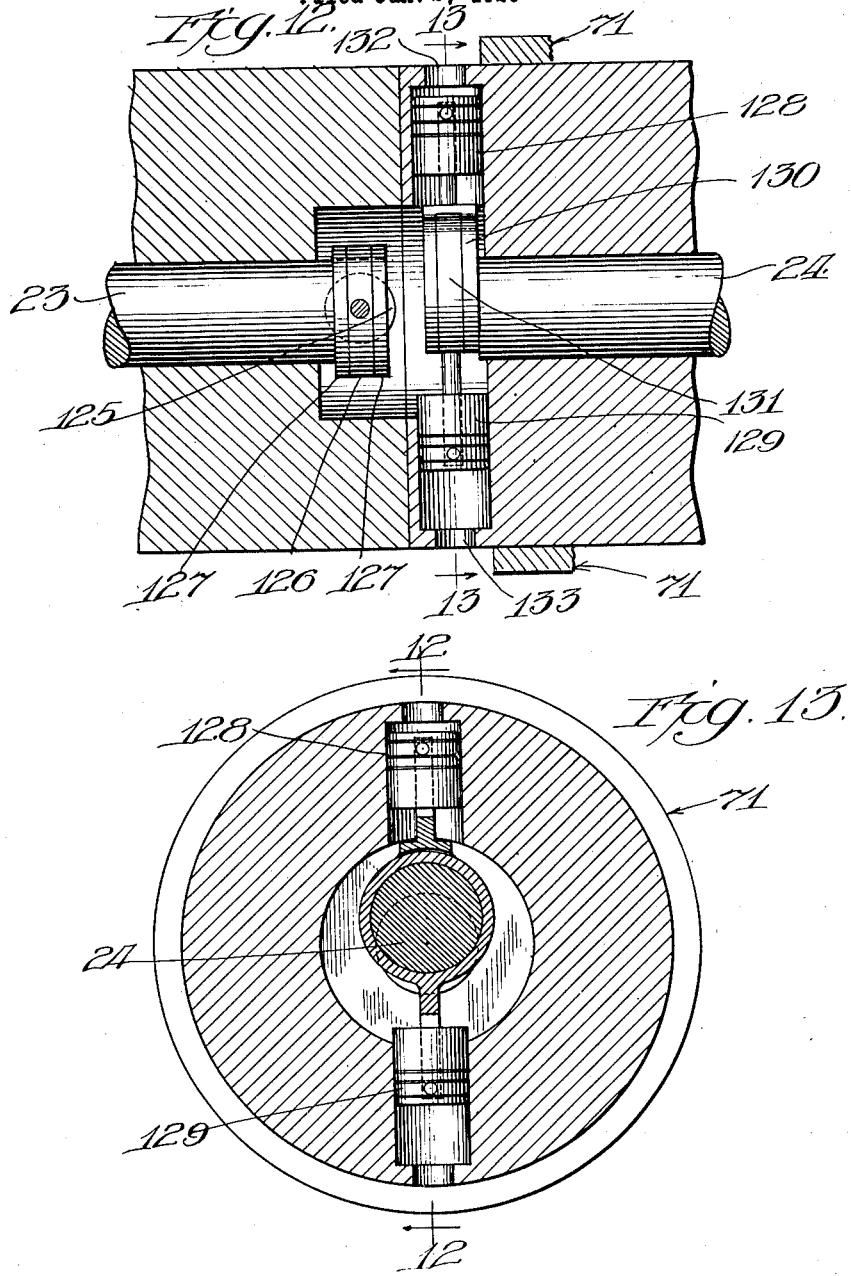

Patented Nov. 1, 1927.

1,647,621

UNITED STATES PATENT OFFICE.

JOHN B. HAWLEY, JR., OF MINNEAPOLIS, MINNESOTA, ASSIGNOR TO HAWLEY INVENTIONS, INC., A CORPORATION OF DELAWARE.

FLUID TRANSMISSION AND THE LIKE.

Application filed January 2, 1925. Serial No. 179.

This invention has to do with certain improvements in fluid transmissions and the like. The invention has reference particularly to improvements in fluid transmissions for motor vehicles such as automobiles, tractors, trucks, etc., but can also be advantageously used for other classes of work such as many locations where it is desirable to be able to change the ratio of driving speed as between two shafts.

One of the objects of the invention is to provide a transmission unit of very simple form and construction and by means of which the speed ratio may be varied with great flexibility of control. In this connection, it is a further object to provide a device of the above kind in which the transmission of power is effected through the medium of oil.

In connection with the above, a further object is to make provision for bringing the driving and driven shafts into direct driving connection after the driven shaft has been brought under way. When the direct driving connection is established the driving connection is produced by direct mechanical drive and without the necessity of using the oil as a driving medium.

A further object of the present invention is to provide an arrangement such that the gear ratio between the two shafts may be varied with relatively easy steps, so that the driven shaft may be brought up to speed without unnecessary shock.

More particularly it is an object of the invention to provide for the transmission of power by the use of gear or cam pumps and motors, the same constituting what may be termed a positive displacement system, as distinguished from the use of centrifugal pump and turbine combinations.

A further object of the invention is to make provision for reversal of drive by the use of the oil, and without the need of interposing reversing gears in the line of shafting or driving forces.

Other objects and uses of the invention will appear from a detailed description of the same, which consists in the features of construction and combinations of parts hereinafter described and claimed.

In the drawings:

Figure 1 shows a vertical longitudinal section through a transmission unit embodying the features of the present invention;

Figs. 2, 3, 4, 5, 6, and 7 are vertical cross sections taken on the lines 2—2, 3—3, 4—4, 5—5, 6—6 and 7—7, respectively, of Fig. 1 looking in the direction of the arrows. In each of these figures the outer shell has been eliminated for simplicity in illustration.

Fig. 8 shows a longitudinal section on the lines 8—8 of Figs. 2, 3, 4, 5, 6 and 7, respectively, looking in the direction of the arrows;

Fig. 9 shows a fragmentary longitudinal section on the line 9—9 of Figs. 2, 3, 4, 5, 6 and 7, respectively, looking in the direction of the arrows;

Fig. 12 shows another fragmentary view similar to a portion of Fig. 1, but illustrating another modified construction of clutching device for direct drive and being a section on the line 12—12 of the Figure 13 looking in the direction of the arrows; and Fig. 13 shows a cross section on the line 13—13 of Fig. 12, looking in the direction of the arrows.

Figure 10:
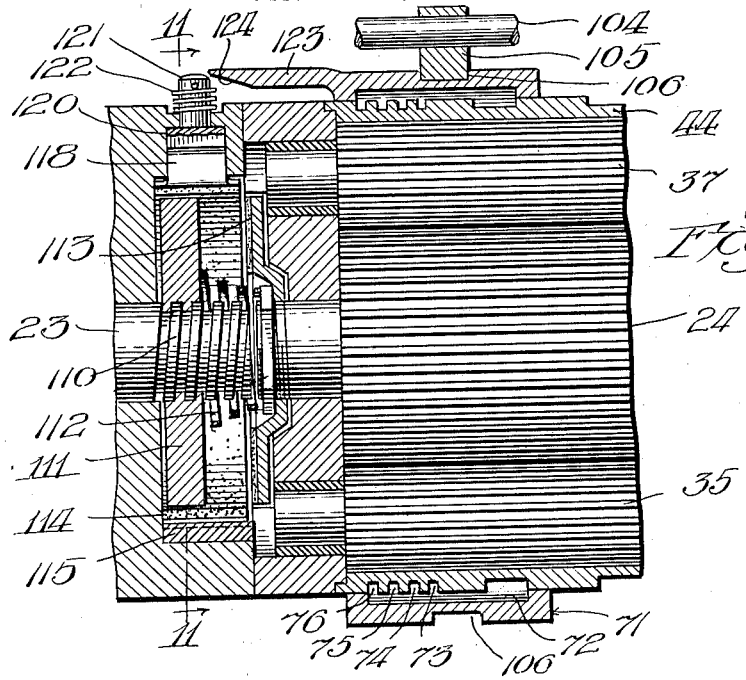
Fig. 10 shows a fragmentary view similar to a portion of Fig. 1, but illustrating a modified arrangement of clutching device for effecting direct drive.

Referring first to Fig. 1, I have illustrated the features of the present invention as incorporated in a transmission enclosed within a stationary casing 14. This casing has a removable cover plate 15 by which its interior is conveniently reached. In the end wall 16 is placed a roller bearing 17 and in the other end wall 18 is placed another roller bearing 19. These roller bearings support the end hubs 20 and 21, respectively, of a cylindrical shaped casing or housing 22 which is thus journaled to rotate freely within the casing 14. This casing 22 constitutes a portion of the transmission element itself.

The driving and driven shafts 23 and 24, respectively, are placed in alignment with each other and are extended through the hub members 20 and 21 as well as the end walls 16 and 18, respectively. Suitable stuffing boxes 25 and 26 may be provided for ensuring oil tight seals of the two shafts.

The transmission housing 22 encloses a pump unit at the driving end and a motor unit at the driven end. The pump unit is operated by the driving shaft 23 and the driven shaft 24 by the motor unit.

In the particular construction illustrated the pump comprises a gear pump including a central gear 27 on the driving shaft 23 meshing with a series of companion gears 28, 29, 30 and 31 working within the housing. The central gear 27 is keyed to the shaft 23 whereas the companion gears 28, 29, 30 and 31 are carried by short shafts 32.

The motor unit includes a central gear 33 keyed to the driven shaft 24 in conjunction with a series of companion gears 34, 35, 36 and 37 working within the housing. These companion gears are carried by the short shafts 38 as illustrated in Fig. 1 in particular.

As a matter of convenience in construction the companion gears of both the pump and motor units may have their respective shafts in the form of projecting studs integral with their gear sections as is evident from comparison of the different figures.

The housing 22 preferably comprises end sections 39 and 40 together with an intermediate section 41 for the pump unit, and end sections 42 and 43 together with an intermediate section 44 for the motor unit. All six of these sections are secured rigidly together by a series of bolts or the like, but as a matter of convenience, I make use of four hollow bolts 45, 46, 47 and 48, as illustrated in several of the different figures. These hollow bolts are carried the full length of the housing 22 and their ends are closed and provided with the end nuts 49, as illustrated.

At the pump end of the device there is a series of four passages 50, 51, 52 and 53 leading inwardly through the end plate 39 to allow inflow of oil, said passages terminating in chambers 54, 55, 56 and 57 at the intake sides of the four gear pumps established by the central gear 27 and the companion gears already referred to. At the discharge sides of these pumps are located the chambers 58, 59, 60 and 61 to which the oil is delivered, said chambers in turn communicating by passages 62, 63, 64 and 65 with suitable openings in the hollow bolts 45, 46, 47 and 48, respectively. Thus the oil drawn in at the driving shaft end of the casing is delivered into the hollow bolts.

Reference to Fig. 6, which is a cross section on the line 6—6 of Fig. 1, will show that the hollow bolts communicate with the radial passages 66, 67, 68 and 69 at the plane of said section. Through these passages the oil is then delivered to an outside annular channel 70 in the central casing member 44 of the motor unit.

On the outside of the motor housing is located a slidable sleeve 71 having within its central portion an inwardly facing annular channel 72. The control sleeve 71 may be slid back and forth into different positions on the motor housing the channel 72 being long enough to receive the oil delivered from the channel 70 in all of several different positions.

There are established four annular channels 73, 74, 75 and 76 in the face of the motor housing corresponding to the four motor gears, respectively.

Examination of Figs. 5, 6 and 7 reveals the oil inlet chambers 77, 78, 79 and 80 of the four motor units and the corresponding oil discharge chambers 81, 82, 83 and 84 respectively of the four motor units.

Examination of Fig. 5, which is a section taken on the line 5—5 of Fig. 1, shows the presence of a radial passage 85 leading inwardly from the channel 76 to the inlet chamber 80 of the fourth motor unit. Similar radial passages 86, 87 and 88 are provided leading inwardly from the channels 73, 74, and 75, respectively, to the corresponding inlet chambers 77, 78 and 79.

All of the discharge chambers 81, 82, 83 and 84 extend lengthwise the full length of the companion gears of the motor units; and at the plane of Fig. 7, which is a section on the line 7—7 of Fig. 1, these chambers communicate with radial passages 89, 90, 91 and 92, respectively, which lead outwards to an annularly outwardly facing channel 93 on the motor housing.

From the above, it is evident that with the control sleeve 71 in the position illustrated in Fig. 1 oil delivered from the pump into the channel 70 will be carried over and delivered to all of the motor units which will, therefore, rotate at relatively slow speed, since the entire motor capacity of the outfit is in service. In this connection it is noted that the motor gears are substantially four times as long as the pump gears, so that each motor gear pair will absorb substantially four times the amount of oil pumped by one of the pump gear pairs. Under the circumstances, the driven shaft will operate at practically one fourth speed as compared to the driving shaft when all of the motor units are in service with the control sleeve 71 at the position illustrated in Fig. 1.

As the control sleeve is shifted to the right in Fig. 1, the different motor units are consecutively thrown out of service, so that the entire output of the pump is successively concentrated on fewer and fewer of the motor pairs. This will result in corresponding increase in gear ratio, and when operating only on a single motor gear pair a practically one to one drive will be established. This drive, however, will be effected through the medium of oil.

In order to make it possible to secure direct drive without the use of oil various direct driving clutch arrangements may be used, one of which is illustrated in the arrangement of Figs. 1 to 9 inclusive. In this case each of the pump shafts 32 or selected ones thereof, are provided with gears 94 and 95 at the ends close to the motor unit, and the sleeve 71 is provided with an overhanging flange 96 together with annular gear teeth 97 thereon which are adapted to engage the gears 94 and 95 when the sleeve 71 is slid further to the left than the particular position illustrated in Fig. 1. This will result in locking the companion pump gears against any rotation with respect to the main pump gear 27, and the rotation of the driving shaft 23 will be positively communicated to the housing and through it to the driven shaft. In connection with the above, the sleeve 71 is keyed to the motor housing, as shown at 98 in Fig. 6 in particular. When the control sleeve 71 is slid to the left of its position in Fig. 1, the gears 94 and 95 are thus locked against rotation which also prevents the pump gears 29 and 31 from rotation within the pump housing. In this way direct drive is established without the need of using oil.

When driving by the use of oil the housing must be retained against rotation. For this reason, I have illustrated a brake band 99 encircling the housing 41 and held in its central portion by a pin 100 which is connected to the outside casing 14. The upper ends 101 and 102 of the brake band are normally forced together by a spring 103, so that the brake is normally set.

An operating rod 104 is extended through the casing 14 and has a block 105 working within the annular channel 106 on the outside face of the control sleeve 71. By shifting the rod 104 back and forth the control sleeve is moved into the different operating positions.

The rod 104 carries a cam block 107 which will enter between the lugs 108 and 109 secured to the ends of the brake band so as to release the brake when the direct drive position is entered. At all other times the housing is held against rotation by the brake.

In order to bring about reverse drive by the use of oil, the control sleeve is shifted towards the right a sufficient distance to cause its inwardly facing channel 72 to span the distance including the channels 70 and 93 of the motor housing. This being the case, oil delivered into the channel 70 will be transferred directly to the channel 93 and thus to the back sides of the various motor gear pairs, resulting in a reverse direction of rotation. The oil will be discharged from rotation. The oil will be discharged from the motor gear pairs through the channels 73, 74, 75 and 76 which were uncovered by the right hand shifting of the control sleeve 71.

Figure 11:
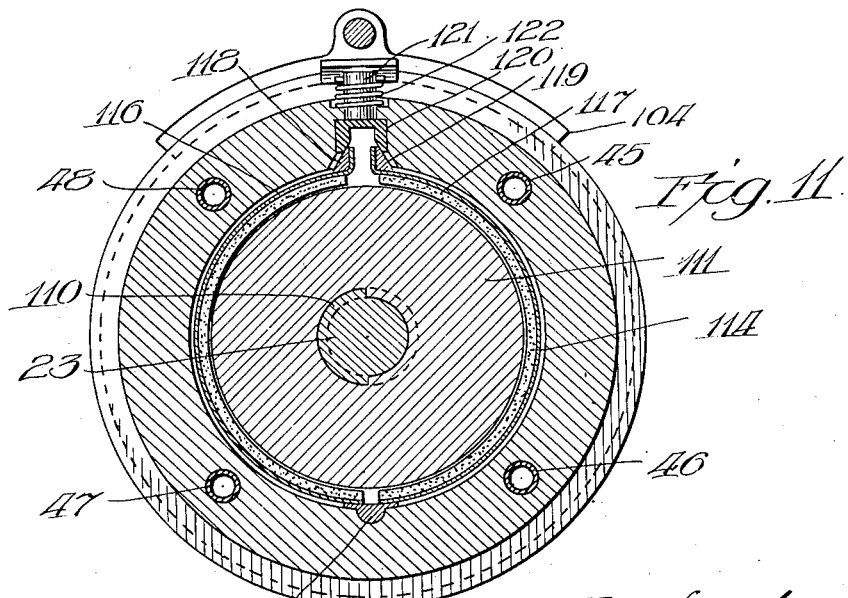
Fig. 11 is a section on the line 11—11 of Fig. 10, looking in the direction of the arrows.

In the modified construction shown in Figs. 10 and 11, the gears 94 and 95 on the pump shafts have been eliminated. In place thereof the driving shaft 23 is threaded, as shown at 110 in Fig. 10, and has threaded thereon a locking block 111. A spring 112 normally presses the locking block towards the left, that is, towards the pump unit and away from the motor unit.

The driven shaft 24 has a suitable clutching surface 113 facing the block 111, so that when said block is forced over against said surface the two shafts are directly locked together for direct forward drive. In this connection, it will be noted that the threading 110 is in such a direction that upon slightly arresting the movement of the block 111, the same will run out along the threads 110 and against the spring 112 until arrested by the surface 113 at which time the direct locking drive is established.

A simple means of arresting or slowing down the movement of the block 111 comprises a brake band 114 placed around the periphery of said block and having its central portion 115 pivoted to the pump housing as by means of a lug. The free ends 116 and 117 of this brake band are provided with cam blocks 118 and 119, respectively, which may be engaged by a U-shaped locking block 120. This locking block has a stud 121 reaching out beyond the surface of the pump housing and normally projected by means of a spring 122. The control sleeve 71 has a lug 123 having a beveled surface 124, so that when the control sleeve is moved to the direct drive position the stud 121 is forced inwardly with the desired action.

In the modified construction of Figs. 12 and 13 the driving shaft 23 is provided with one or more radial pump elements 125 operated by eccentrics 126 and 127, said pump elements normally forcing oil back and forth against their outer faces, said oil working in and out of the casing. Similarly, the driven shaft 24 is connected with a pair of pump elements 128 and 129 working within the motor housing. These pump elements are connected to eccentrics 130 and 131 connected to the driven shaft. The pump elements 128 and 129 likewise serve to pump oil in and out of the motor casing through ports 132 and 133.

The control sleeve 71 is in this case so formed that when shifted beyond the position illustrated in Fig. 1 and to the direct drive position, it will override the ports of the pump elements so as to seal the same in oil tight fashion and thus prevent the back and forth oil circulation. This will result in locking the shafts together for direct drive.

It will be noted that the direction of rotation of the driven shaft is the same as that of the driving shaft, so that the driven shaft may be accelerated by the use of oil through various stages up to the full speed of the driving shaft, and then the shafts directly locked together for direct drive without the use of oil.

While I have herein shown and described only certain embodiments of the features of my present invention, still I do not intend to limit myself to the same, except as I may do so in the claims.

I claim:

1. A transmission device including in combination aligned driving and driven shafts, a transmission housing within which said shafts are journaled, a gear pump within the driving end of said housing and including a central gear on the driving shaft together with a series of companion pump gears, there being intake passages through said end of the casing to each of said companion gears, a gear motor within the driven end of the housing and including a central gear on the driven shaft together with a series of companion motor gears, a series of longitudinally extending pressure liquid passages in the housing leading from the discharge sides of the pump gears to a position adjacent to the motor gears, outwardly reaching passages for delivering liquid therefrom to the periphery of the housing, a series of inwardly reaching liquid passages from the surface of the housing to points adjacent to the several motor companion gears, said passages being located at different positions longitudinally of the housing, a series of radially extending liquid discharge passages from the companion gears of the motor, and a control sleeve slidably mounted on the surface of the housing and having an inwardly facing annular channel adapted to place the pressure liquid passages in communication with the inwardly reaching motor passages selectively or in communication with the outwardly reaching motor passages as desired, together with means for clutching the driving and driven shafts directly together mechanically, substantially as described.

2. A transmission device including in combination aligned driving and driven shafts, a transmission housing within which said shafts are journaled, a gear pump within the driving end of said housing and including a central gear on the driving shaft together with a series of companion pump gears, there being intake passages through said end of the casing to each of said companion gears, a gear motor within the driven end of the housing and including a central gear on the driven shaft together with a series of companion motor gears, a series of longitudinally extending pressure liquid passages in the housing leading from the discharge sides of the pump gears to a position adjacent to the motor gears, outwardly reaching passages for delivering liquid therefrom to the periphery of the housing, a series of inwardly reaching liquid passages from the surface of the housing to points adjacent to the several motor companion gears, said passages being located at different positions longitudinally of the housing, a series of radially extending liquid discharge passages from the companion gears of the motor, and a control sleeve slidably mounted on the surface of the housing and having an inwardly facing annular channel adapted to place the pressure liquid passages in communication with the inwardly reaching motor passages selectively or in communication with the outwardly reaching motor passages as desired, substantially as described.

3. A transmission device including in combination aligned driving and driven shafts, a transmission housing within which said shafts are journaled, a gear pump within the driving end of said housing and including a central gear on the driving shaft together with a series of companion pump gears, there being intake passages through said end of the casing to each of said companion gears, a gear motor within the driven end of the housing and including a central gear on the driven shaft together with a series of companion motor gears, a series of longitudinally extending pressure liquid passages in the housing leading from the discharge sides of the pump gears to a position adjacent to the motor gears, outwardly reaching passages for delivering liquid therefrom to the periphery of the housing, a series of inwardly reaching liquid passages from the surface of the housing to points adjacent to the several motor companion gears, a series of radially extending liquid discharge passages from the companion gears of the motor, and a control sleeve slidably mounted on the surface of the housing and having an inwardly facing annular channel adapted to place the pressure liquid passages in communication with the inwardly reaching motor passages selectively, substantially as described.

4. A transmission device including in combination aligned driving and driven shafts, a transmission housing within which said shafts are journaled, a gear pump within the driving end of said housing and including a central gear on the driving shaft, together with a series of companion pump gears, there being intake passages through said end of the casing to each of said companion gears, a gear motor within the driven end of the housing, and including a central gear on the driven shaft together with a series of companion motor gears, each companion motor gear and the central motor gear having a liquid capacity substantially equal to the entire pumping capacity of the pump, a series of longitudinally extending pressure liquid passages in the housing reaching from the discharge sides of the pump gears to a position adjacent to the motor gears, outwardly reaching passages for delivering liquid therefrom to the periphery of the housing, a series of inwardly reaching liquid passages from the surface of the housing to points adjacent to the several motor companion gears, said passages being located at different positions longitudinally of the housing and individually serving each motor companion gear, a series of outwardly extending liquid discharge passages from the motor companion gears, and a control sleeve slidably mounted on the surface of the housing and having an inwardly facing annular channel adapted to place the pressure liquid passages in communication with the inwardly reaching motor passages selectively, whereby the total pumping capacity of the pump may be distributed to all of the motor gear pairs or to a smaller number of motor gear pairs selectively at the will of the operator, substantially as described.

5. A transmission device including in combination aligned driving and driven shafts, a transmission housing within which said shafts are journaled, a gear pump within the driving end of said housing and including a central gear on the driving shaft, together with a series of companion pump gears, there being intake passages through said end of the casing to each of said companion gears, a gear motor within the driven end of the housing, and including a central gear on the driven shaft together with a series of companion motor gears, each companion motor gear and the central motor gear having a liquid capacity substantially equal to the entire pumping capacity of the pump, a series of longitudinally extending pressure liquid passages in the housing reaching from the discharge sides of the pump gears to a position adjacent to the motor gears, outwardly reaching passages for delivering liquid therefrom to the periphery of the housing, a series of inwardly reaching liquid passages from the surface of the housing to points adjacent to the several motor companion gears, a series of outwardly extending liquid discharge passages from the motor companion gears, and a control sleeve slidably mounted on the surface of the housing and having an inwardly facing annular channel adapted to place the pressure liquid passages in communication with the inwardly reaching motor passages selectively, whereby the total pumping capacity of the pump may be distributed to all of the motor gear pairs or to a smaller number of motor gear pairs selectively at the will of the operator, substantially as described.

6. A transmission device including in combination aligned driving and driven shafts, a transmission housing within which said shafts are journaled, a gear pump within the driving end of said housing and including a central gear on the driving shaft, together with a series of companion pump gears, there being intake passages through said end of the casing to each of said companion gears, a gear motor within the driven end of the housing, and including a central gear on the driven shaft together with a series of companion motor gears, each companion motor gear and the central motor gear having a liquid capacity substantially equal to the entire pumping capacity of the pump, a series of longitudinally extending pressure liquid passages in the housing reaching from the discharge sides of the pump gears to a position adjacent to the motor gears, passages for delivering liquid therefrom, other passages within the housing reaching to points adjacent to the several motor companion gears, discharge passages in the housing from the motor companion gears together with means for placing the pressure liquid passages in communication with all of the motor passages or the different motor passages selectively at the will of the operator, whereby the total pumping capacity of the pump may be distributed to all of the motor gear pairs or to a smaller number of motor gear pairs selectively, substantially as described.

7. A transmission device including in combination aligned driving and driven shafts, a housing within which they are journaled, suitable journals for said housing permitting rotation thereof on the same axis as the two shafts, pumping means within one end of the housing in conjunction with the driving shaft and comprising a sun gear on the driving shaft together with a plurality of planetary gears intermeshing therewith and journaled within the housing; motor means in the other end of the housing and comprising a sun gear on the driven shaft together with a series of planetary gears intermeshing therewith and journaled in the housing, said motor gears being of greater axial length than the pump gears for the purpose specified, passages for the delivery of liquid under pressure from all of the pump gears to the planetary motor gears, and valve means operative to control the number of planetary motor gears operatively connected with the pump gears, substantially as, and for the purpose, set forth.

8. A transmission device including in combination aligned driving and driven shafts, a housing within which they are journaled, a pump means within one end of the housing in conjunction with the driving shaft and comprising a sun gear on the driving shaft together with a plurality of planetary gears intermeshing therewith and journaled within the housing, motor means in the other end of the housing and comprising a sun gear on the driven shaft together with a series of planetary gears intermeshing therewith and journaled in the housing, said motor gears being of greater axial length than the pump gears for the purpose specified, passages for the delivery of liquid under pressure from the pump gears, to the planetary motor gears, and valve means operative to control the number of planetary motor gears operatively connected with the pump gears, substantially as, and for the purpose, set forth.

9. A transmission device including in combination aligned driving and driven shafts, a housing within which they are journaled, pumping means within one end of the housing in conjunction with the driving shaft comprising a sun gear on the driving shaft together with a plurality of planetary gears intermeshing therewith and journaled within the housing, motor means in the other end of the housing and comprising a sun gear on the driven shaft together with a series of planetary gears intermeshing therewith and journaled in the housing, one set of gears being of greater axial length than the other set for the purpose specified, passages for the delivery of liquid under pressure from the pump gears to the planetary motor gears, and valve means operative to control the number of planetary motor gears operatively connected with the pump gears, substantially as, and for the purpose, set forth.

10. A transmission device including in combination aligned driving and driven shafts, a sectional housing within which said shafts are journaled, a rotary gear pump occupying one section of the housing, a rotary gear motor occupying another section of the housing, driving connections between the rotary gear pump and the driving shaft and between the rotary gear motor and the driven shaft respectively, a series of tubular tie elements for the drawing of the housing sections together, passages between the tubular tie elements and the rotary gear pump, passages between the tubular tie elements and the rotary gear motor, and means for controlling all of said passages substantially as described.

JOHN B. HAWLEY, Jr.